Oct. 18, 1960   JEAN-PIERRE BOREL ET AL   2,956,327
CERAMIC FERROELECTRIC BODIES
Filed Jan. 22, 1954
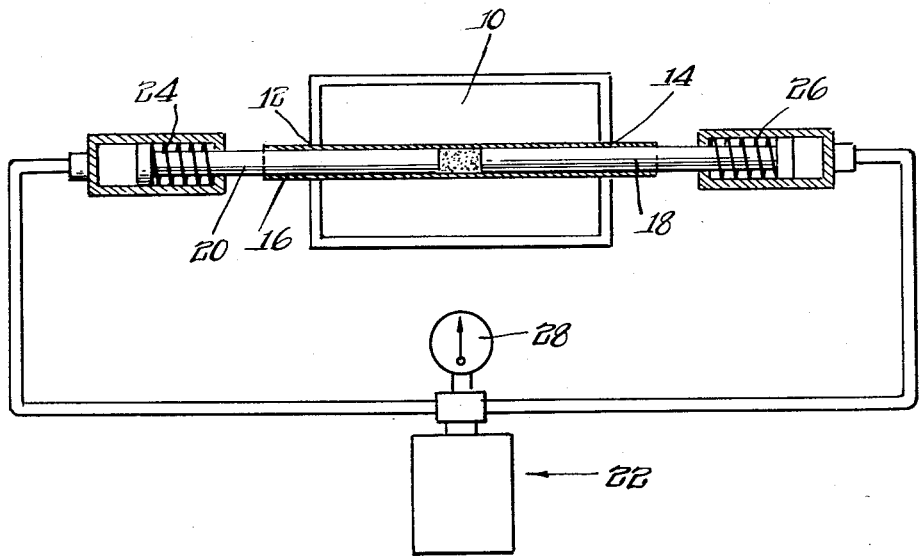
INVENTORS.
Jean-Pierre Borel
Lucien A. Petermann 2,956,327
Patented Oct. 18, 1960

2,956,327

CERAMIC FERROELECTRIC BODIES

Jean-Pierre Borel, Vevey, Switzerland, and Lucien A. Petermann, Metuchen, N.J., assignors, by mesne assignments, to Gulton Industries, Inc., Metuchen, N.J., a corporation of New Jersey Filed Jan. 22, 1954, Ser. No. 405,626

5 Claims. (Cl. 25—157)

This invention relates to the production of improved ceramic (non-metallic) ferroelectric and piezoelectric (hereafter, for convenience, generically called "ferroelectric") bodies.

Ceramic ferroelectric bodies have heretofore been prepared in a variety of ways which, generally speaking, comprise forming the ceramic ferroelectric body by pressing, casting, extrusion or by means of thin sheet techniques followed by a burning or firing operation at elevated temperatures. Such procedures are disclosed in a large number of patents and other publications, illustrative of which are U.S. Patents Nos. 2,434,271; 2,486,410; 2,520,376 and 2,582,993. The ceramic ferroelectric bodies have found and are continuing to find substantial commercial use as capacitors, as piezo-electric elements and transducers, and for various applications in the electrical and electronic fields.

It has been found, in accordance with the present invention, that marked improvements are obtained if the burning or firing step in the production of the ceramic ferroelectric bodies is carried out while maintaining said bodies under pressure of at least 5 atmospheres. The said improvements manifest themselves not only in relation to the physical and electrical properties of the finished bodies but, also, in many cases, with respect to procedural details or processing aspects. Thus, for instance, the finished bodies produced pursuant to the present invention are characterized by high density, good homogeneity, low internal stress, and improved electrical and mechanical properties. Finished shapes can be made without the necessity for machining or cutting operations and rejects are sharply reduced. By varying and adjusting the pressure on the ceramic ferroelectric bodies during the firing operation, large bodies can be fired without danger of cracking due to shrinkage and the like. In this connection, it may be pointed out that, in present or heretofore practiced conventional procedures for making ceramic ferroelectric bodies, shrinkage of said bodies during the firing operation is not infrequently as high as about 20% and this commonly results in appreciable breakage of said bodies. Through the practice of the present invention, the difficulties and problems associated with shrinking during firing are materially reduced. It is also to be noted that, in the firing of ceramic ferroelectric bodies at ordinary pressures in accordance with presently known techniques, the stresses within the ceramic ferroelectric bodies increase with increasing sizes of the bodies being fired so that it is difficult and frequently impossible to obtain large bodies fired in one piece. In most instances, experience with such heretofore known procedures has shown that large ceramic ferroelectric bodies fired at ordinary atmospheric pressure develop cracks which render said bodies of no value for their intended purposes. In sharp contrast thereto, it has been found, surprisingly enough, that increasing the size of the bodies being fired actually results in facilitating the production thereof and the large bodies do not develop such cracks when fired under substantial pressures as encompassed by our present invention.

A particularly valuable aspect of the present invention is that it makes possible the production of substantially non-porous ceramic ferroelectric bodies by relatively simple procedures. Ceramic ferroelectric bodies which are produced by conventional methods have a large percentage of voids unevenly distributed within the body. Through the practice of the teachings of the present invention, ceramic ferroelectric bodies have been produced, for instance, from barium titanate, in which the content of voids is below 1%, indeed, below 0.1%, said bodies having specific gravities in excess of 5.75. Such bodies have unique properties electrically and mechanically.

From the procedural standpoint, the practice of the present invention makes possible the use of lower firing temperatures and shorter firing times or periods. Thus, for instance, in an illustrative example, whereas by certain presently used techniques firing temperatures of the order of 1400 to 1500 degrees C. and a firing period of 12 to 20 hours is used in making a certain barium titanate body, the practice of the present invention makes possible the use of a firing temperature of about 900 to 1250 degrees C. and a firing period of about 2 minutes to 2 hours. Indeed, with selection of adequately high pressures and temperatures, it is possible to complete the process in a few seconds, for instance, 5 to 20 seconds or more. The fact that lower firing temperatures are possible and feasible results in the saving of fuel. It results, also, in simplifying the problem of providing suitable materials upon which to support the ceramic ferroelectric bodies during the firing operation since, at the lower temperatures at which the firing procedure can be carried out, a larger class of materials is available for use without danger of effecting interaction between said latter materials and the ceramic ferroelectric materials. A still further advantage resides in the fact that liquid slip techniques, which are commonly now used in the production of films and the like of ceramic ferroelectric materials, need not be used, and the complications attendent thereon and the utilization of various extraneous ingredients required in said slips can all be eliminated when the present invention is practiced.

The invention, in its broader phases, is applicable to the production of bodies of ceramic ferroelectric materials generally. Typical examples of such ceramic ferroelectric materials are, for instance, alkaline earth titanates and zirconates illustrative of which are barium titanate, calcium titanate, strontium titanate, barium zirconate, calcium zirconate and and mixtures of any two or more thereof. Such ceramic ferroelectric materials can be modified by additions thereto of small proportions, generally from a fraction of 1% to 5 or 6%, of various oxides such as lead oxides, tin oxides, and rare earth metal oxides such as cerium oxide, samarium oxide and lanthanum oxides or mixtures thereof. The practice of the invention is especially important in connection with the production of barium titanate bodies or ceramic ferroelectric bodies which contain predominately barium titanate, most advantageously bodies which contain upwards of 80% and, particularly, upwards of 90% barium titanate.

As has been stated above, the firing of the ceramic ferroelectric body is effected while the latter is maintained at a pressure of at least several atmospheres, namely, at least about 5 atmospheres. It is preferred, however, to operate at higher pressures such as 25 or 50 to 100 atmospheres, and especially at pressures of the order of 100 to 1000 atmospheres. To this end, the pieces of preformed ceramic ferroelectric materials can be held between suitable clamping plates or the like, or the ceramic ferroelectric materials can be molded or shaped or formed as desired and while maintained under pressure of the desired magnitude, placed into the furnace or the like to carry out the firing operation. It will, of course, be understood that the ceramic ferroelectric bodies can be produced in such desired shapes as may be required as, for instance, sheets, tubes, rods, discs, powders or other pulverulent form, and the like, and the term "bodies" is, therefore, used herein in a generic sense to cover the product in whatever physical shape or form it may be prepared.

With reference to the firing temperatures and times, it will, of course, be appreciated that such will vary, depending, among other things, upon the particular ceramic ferroelectric materials involved and the exact results desired. In general, in most cases, firing temperatures of about 900 to about 1250 degrees C. and a time period from a few minutes to a few hours, for instance, about 20 minutes, will be found to be effective. Materially higher temperatures can, however, be employed and the same is true as to materially longer firing periods. The higher the pressure the shorter will be the period of time and the lower the temperature, generally speaking, to obtain a given desired result.

During at least a part of the firing step, or thereafter, the atmosphere in the furnace can be adjusted so as to render it oxidizing, reducing or neutral, as desired, whereby special properties can be imparted to the ceramic ferroelectric bodies as, for instance, to render their surfaces insulating, conductive or semi-conductive.

In the accompanying drawing, the figure shows, in schematic form, one illustrative type of equipment which is useful in carrying out the firing operation under the pressures described above. The furnace 10 is open at both ends 12, 14 and is adapted, if desired, to maintain an oxidizing, reducing or neutral atmosphere. A removable tube 16, open at both ends, is shown in position in the furnace, extending through and beyond the open ends 12, 14 of the furnace. Disposed within the tube 16 from the opposite open ends thereof are pistons 18, 20 which, when force is applied thereto, serve to compress the ceramic ferroelectric material, in the form of a powder, paste, disc or other shaped body, between the ends of the two pistons. The force exerted on the pistons can be effected through various means as, for example, hydraulically or mechanically, as schematically shown at 22. Disposed between the means 22 and the pistons are spring members 24, 26 and a suitable dynamometer or pressure regulator 28 to indicate the pressure, and to allow for the uniform increase of the pressure to the desired or predetermined extent.

Where it is desired to effect control of the atmosphere within the tube 16 in the area where pressure is being exerted on the ceramic ferroelectric material, various methods are available. Thus, for instance, the tube 16 can be made of a porous material, that is, one that is pervious to gases, as, for example, Carborundum, sillimanite, nullite or aluminum oxide. Since, then, the interior of the furnace 10 and the interior of the tube 16 are in gaseous communication with each other, the control of the furnace atmosphere will serve to control the atmosphere within the tube 16. Another procedure for controlling the atmosphere in the tube 16 is simply by passing therethrough by conventional means any desired oxidizing, reducing or neutral gas. A still further means for effective control of the atmosphere in the area of the ceramic ferroelectric material is to mix agents with said material which agents, at the firing temperatures, will gasify to produce the desired atmosphere.

The pistons 18, 20, or the inner ends thereof, can be made of the same materials as those of which the tube 16 are made as described above. Good results are obtained with pistons made of aluminum oxide or zirconium oxide. In certain cases, it may be desirable to insulate the ceramic ferroelectric powder or other body from contact with the material of which the piston is made. In such cases, the inner ends of the pistons can be faced with thin metallic foils or plates such as, by way of illustration, platinum, palladium, nickel, and alloys such as 30% platinum-70% silver. Satisfactory results are obtained, for instance, with metal foils or plates of thicknesses of the order of 0.1 to 0.01 millimeter.

In the use of such equipment, one of the pistons, if desired having the protective or insulating metal covering on its inner face, is introduced into the tube 16 which is in vertical position. Then the ceramic ferroelectric material is introduced on top of the inner surface of said piston or on top of the metal covering, as the case may be. Then the other piston, with or without its inner end being provided with the protective or insulating metal covering, is introduced through the other end of the tube 16 whereby to position the ceramic ferroelectric material between the two pistons. The tube 16 is then tilted into horizontal position and pushed into the furnace. The outer ends of the pistons are then connected to the source of pressure. The pressure on the ceramic ferroelectric material may be exerted at room temperatures or before the furnace is brought to the selected firing temperature, or such pressure can be exerted somewhat below or at the ultimate selected firing temperature. At any rate, once the firing temperature is reached, if sufficient pressure is not already being exerted on the ceramic ferroelectric material, the pressure is increased until the desired pressure is reached and firing is completed.

The ceramic ferroelectric materials may also, if desired, as indicated above, be subjected, in the form of pastes, to firing under pressure pursuant to the present invention. Such pastes may be prepared, for instance, by dispersing the powdered ceramic ferroelectric material in water or an organic solvent or vehicle or binder. During the firing operation, the water or solvent or vehicle or binder, as the case may be, will evaporate or burn out of the ceramic ferroelectric material.

It may also be pointed out that, where the ceramic ferroelectric material is produced in the form a rod, disc or shaped solid body, after being fired under pressure, as described herein, said shaped solid body can be ground or otherwise disintegrated to form pulverulent particles or powders and the latter can be used to form bodies, through compression techniques with or without various binders, having interesting electrical and related properties.

The following examples are illustrative of the practice of the invention. It will be understood that numerous other examples can be carried out in the light of the guiding principles and teachings contained herein.

*Example 1*

A number of barium titanate ceramic discs about 1 inch in diameter and 0.05 inch thick, prepared by conventional procedures, is clamped between plates under a pressure of about 100 atmospheres and fired at a temperature of about 1100 degrees C. for 30 minutes.

*Example 2*

Sheets of barium titanate-strontium titanate, containing about 90% barium titanate and 10% strontium titanate, said sheets having a thickness of about 0.02 inch, are clamped between plates under a pressure of 150 atmospheres and fired at a temperature of about 1075 degrees C. for about 2 hours.

*Example 3*

Sheets of barium zirconate, about 0.05 inch in thickness, are clamped between plates under a pressure of about 50 atmospheres and fired at about 1050 degrees C. for about 1 hour.

*Example 4*

Sheets made from a composition comprising 85% barium titanate, 12% calcium titanate and 3% cerium oxide, clamped between plates under a pressure of 200 atmospheres, are fired at about 1150 degrees C. for 3 hours.

*Example 5*

A barium titanate disc 15 inches in diameter and 2 inches thick is clamped between plates under a pressure of about 500 atmospheres and fired at a temperature of about 1200 degrees C. for 2 minutes.

*Example 6*

Discrete particles of barium titanate powder are compressed under a pressure of about 1000 atmospheres and fired for 15 seconds at a temperature of about 1200 degrees C.

While the invention has been described in detail, no unnecessary limitations should be read thereinto, the scope of the invention being pointed out in the appended claims.

What we claim as new and desire to protect by Letters Patent of the United States is:

1. The method of producing a solid fused homogeneous ceramic ferroelectric body having improved physical and electrical properties which comprises confining and subjecting a ceramic ferroelectric material to a pressure of at least 5 atmospheres, firing said confined and compressed material at an elevated temperature, which is less than the normal fusion temperature of said material at atmospheric pressure, for a period of time at least to fuse said material into a fused homogeneous mass, and cooling said mass to solidify the same into the solid fused homogeneous ceramic ferroelectric body.

2. The method of producing a solid fused homogeneous ceramic ferroelectric body having improved physical and electrical properties which comprises confining and subjecting a ceramic ferroelectric material to a pressure of 5 to about 1000 atmospheres, firing said confined and compressed material at an elevated temperature between about 900 and about 1,250 degrees C. for a period of time at least to fuse said material into a fused homogeneous mass, and cooling said mass to solidify the same into the solid fused homogeneous ceramic ferroelectric body.

3. A new and useful ceramic ferroelectric body having improved physical and electrical properties, comprising a solid body of compressed fused homogeneous ceramic ferroelectric material, produced in accordance with the method of claim 1.

4. The method of claim 1 in which the ferroelectric material is selected from the group consisting of titanates and zirconates and mixtures thereof and which also includes up to 6% of rare earth metal oxides.

5. A new and useful ceramic ferroelectric body having improved physical and electrical properties, comprising a solid body of compressed fused homogeneous ceramic ferroelectric material, produced in accordance with the method of claim 1, said ceramic ferroelectric material being selected from the group consisting of titanates and zirconates and mixtures thereof, and which includes up to 6% of rare earth metal oxides.

References Cited in the file of this patent

UNITED STATES PATENTS

| | | |
|---|---|---|
| 2,091,569 | Ridgway et al. | Aug. 31, 1937 |
| 2,125,588 | Ridgeway | Aug. 2, 1938 |
| 2,436,840 | Wainer | Mar. 2, 1948 |
| 2,563,307 | Burnham et al. | Aug. 7, 1951 |
| 2,601,105 | Dunmire | June 17, 1952 |
| 2,624,709 | Coffeen | Jan. 6, 1953 |
| 2,696,651 | Gravely | Dec. 14, 1954 |
| 2,739,900 | Dary | Mar. 27, 1956 |
| 2,803,553 | Oshry | Aug. 20, 1957 |